June 20, 1939.  H. F. SMITH  2,162,760
STEERING WHEEL HUB STRUCTURE
Filed May 2, 1938
FIG.I.
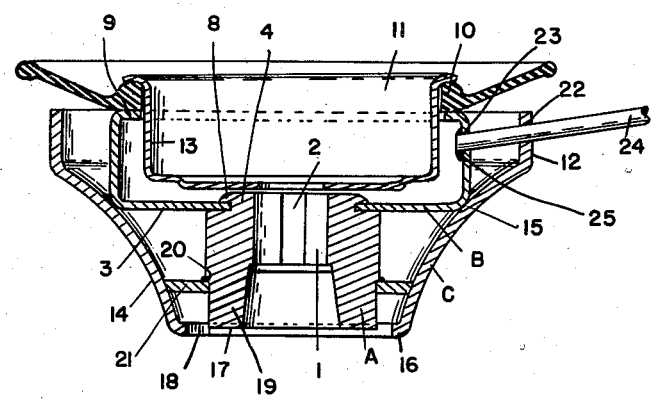
FIG.2.
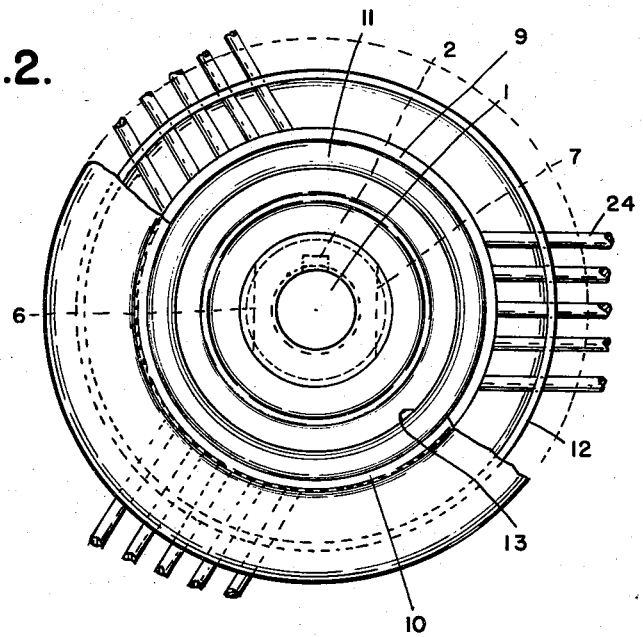
INVENTOR
HARRY F. SMITH
BY
ATTORNEYS Patented June 20, 1939

2,162,760

UNITED STATES PATENT OFFICE 2,162,760

STEERING WHEEL HUB STRUCTURE

Harry F. Smith, Toledo, Ohio, assignor to The Acklin Stamping Company, Toledo, Ohio, a corporation of Ohio Application May 2, 1938, Serial No. 205,635

16 Claims. (Cl. 74—552)

This invention relates generally to vehicle steering wheels and refers more partially to the hub structure thereof.

One of the essential objects of the invention is to provide a structure of this type that is pleasing in appearance and strong and durable in construction.

Another object is to provide a hub structure wherein the parts are so constructed and arranged that they may be effectively united by hydrogen-electric brazing operations.

Another object is to provide a hub structure that is compact and economical to manufacture.

Other objects, advantages and novel details of construction of this invention will be made more apparent as this description proceeds, especially when considered in connection with the accompanying drawing, wherein:

Figure 1 is a fragmentary vertical sectional view through a steering wheel embodying my invention;

Figure 2 is a top plan view of the structure illustrated in Figure 1.

Referring now to the drawing, A is the bushing, B is the inner shell, and C is the outer shell of a hub structure embodying my invention.

Preferably the bushing A is a screw machine part and has a suitable bore 1 and keyway 2 for engagement with a steering shaft (not shown).

The inner shell B is a relatively light gauge sheet metal stamping and is preferably cup-shape in configuration. The base 3 of this shell is sleeved upon the reduced upper end 4 of the bushing and engages a shoulder 5 thereof. Preferably portions 6 and 7 at diametrically opposite sides of the bushing are flat and are engaged by similar flattened portions of the base 3 to prevent relative turning movement between the parts. In the process of construction, portions 8 of the bushing A are clinched over the base 3 whereupon the latter is secured to the bushing by a hydrogen-electric brazing operation. At its upper edge the shell B has an inturned flange 9 that forms a seat for a resilient support 10 for a horn push button (not shown) and serves to center a suitable cup 11 of the push button assembly.

The outer shell C is a relatively heavy gauge sheet metal stamping and serves as a skirt for the shell B and bushing A. Preferably this outer shell C has an upright rim 12 spaced from and substantially concentric with the upright sides 13 of the inner shell B and has a depending substantially frusto-conical portion 14 bearing against and secured by a hydrogen-electric brazing operation to the rounded corner 15 of the inner shell. The base 16 of the frusto-conical portion is slightly below the lower end 17 of the bushing and has a suitable opening 18 for the head (not shown) of a steering column.

Sleeved upon a reduced portion 19 of the bushing and engaging a shoulder 20 thereof is a washer 21 that serves as a spacer and attaching plate for the shell C. Preferably this washer 21 is secured to both the bushing A and to the shell C by hydrogen-electric brazing operations.

In the present instance the upright walls 12 and 13 of the outer and inner shells have aligned holes 22 and 23, respectively, for suitable spokes such as 24. As shown, the inner ends 25 of the spokes are anchored upon the inner sides of the upright walls 13 of the inner shell.

Thus, in my construction the base 3 of the inner shell and the washer 21 serve effectively as spacers and braces between the bushing A and outer shell C; the inner shell B provides the proper mounting for the cup 11 and resilient support 10 for the horn push button; and the spokes 24 have spaced bearings and are securely anchored within the hub structure. As a result, my construction as a whole is compact and sturdy and comprises relatively few parts which can be readily, accurately and economically made and assembled.

What I claim as my invention is:

1. In a steering wheel, a hub structure including a bushing having an opening for engagement with a steering shaft, an outer shell spaced from the bushing and having an opening for the head of a steering column, and an inner shell having a portion serving as a brace and spacer between the bushing and outer shell and having another portion forming a seat for a resilient support for a horn push button and serving to center a cup of a push button assembly.

2. In a steering wheel, a hub structure including a bushing having an opening for engagement with a steering shaft, an outer shell spaced from the bushing and having an upright rim, an inner shell having a portion extending between and secured to the bushing and outer shell and having an upright portion spaced from and substantially concentric with the upright rim of the outer shell, and spokes extending through holes in the concentric portions of the outer and inner shells and rigidly secured to one of them.

3. In a steering wheel, a hub structure including a bushing having an opening for engagement with a steering shaft, an outer shell spaced from the bushing and having an opening for the head of a steering column, vertically spaced members extending between and rigidly secured to said bushing and outer shell, one of said members and said outer shell having spaced substantially concentric upright portions, and spokes extending through holes in said concentric upright portions and rigidly secured to one of them.

4. In a steering wheel, a hub structure including a bushing having on opening for engagement with a steering shaft, an outer shell spaced from the bushing and having an opening for the head of a steering column, a washer sleeved upon the bushing and serving as a spacer for the outer shell, and an inner shell having a portion sleeved on the bushing in spaced relation to the washer and serving as a spacer between the bushing and outer shell, said inner shell and said outer shell having spaced portions apertured for the reception of spokes.

5. In a steering wheel, a hub structure including a bushing having an opening for engagement with a steering shaft, an outer shell spaced from the bushing and having an opening for the head of a steering column, a washer sleeved upon the bushing and serving as a spacer for the outer shell, and an inner shell having a portion sleeved on the bushing in spaced relation to the washer and serving as a spacer between the bushing and outer shell, said inner shell and said outer shell having spaced upright portions apertured for the reception of spokes, the upright portion of said inner shell also having a flange forming a seat for a support for a horn push button and serving to center a cup of a push button assembly.

6. In a steering wheel, a hub structure including a center member apertured to receive a part of a steering shaft, and inner and outer shells encircling said center member and having radially spaced rim portions, said portions having substantially aligned holes therein for radially extending spokes, the inner shell being rigid with the center member, and the outer shell constituting a skirt for both the center member and inner shell and being rigid with the latter.

7. In a steering wheel, a hub structure including a center member apertured to receive a part of a steering shaft, and inner and outer shells encircling said center member and having radially spaced rim portions, said portions having substantially aligned holes therein for radially extending spokes, the inner shell being substantially cup-shaped and having the base thereof rigidly mounted on said center member, the outer shell forming a skirt for both said center member and inner shell and being rigid with the base of the latter.

8. In a steering wheel, a hub structure including a bushing having an opening for engagement with a steering shaft, an outer shell spaced from the bushing, a member extending between and rigidly secured to said bushing and outer shell, said member and said outer shell having spaced substantially concentric upright portions, and spokes extending through holes in said concentric upright portions and rigidly secured to one of them.

9. In a steering wheel, a hub structure including a center member apertured to receive a part of a steering shaft, and inner and outer shells for said member, the inner shell being fixed to said member, the outer shell being fixed to said inner shell, said shells having radially spaced rim portions, and radially extending spokes engaging holes in both of said shells and fixed to one of them.

10. In a steering wheel, a hub structure including a center member apertured to receive a part of a steering shaft, a shell spaced from and forming a skirt for said member, and a cup-shaped member extending between and rigidly united to said center member and shell, said cup-shaped member and shell having radially spaced rim portions, said portions having substantially aligned holes for radially extending spokes.

11. In a steering wheel, a hub structure including a center member apertured to receive a part of a steering shaft, a shell spaced from and forming a skirt for said member, and a cup-shaped member extending between and rigidly united to said center member and shell, said cup-shaped member and shell having substantially concentric spaced portions apertured for radially extending spokes.

12. In a steering wheel, a hub structure including a center member apertured to receive a part of a steering shaft, a substantially cup-shaped shell having its base fixed to said center member, the side walls of said cup-shaped shell having a lateral flange forming a seat for a resilient support for a horn push button and serving to center a cup of a push button assembly.

13. In a steering wheel, a hub structure including a center member apertured to receive a part of a steering shaft, a substantially cup-shaped shell having its base fixed to said center member, and an outer shell forming a skirt for both the center member and cup-shaped shell, said outer shell being fixed to the cup-shaped shell, said shells having radially spaced rim portions, said portions being apertured to receive radially extending spokes.

14. In a steering wheel, a hub structure including a bushing having an opening for engagement with a steering shaft, an outer shell spaced from the bushing and having an upright rim, and an inner shell having a portion serving as a brace and spacer between the bushing and outer shell and having an upright portion substantially concentric with and spaced from the rim of the outer shell, said concentric rim and upright portion having holes therein for receiving radially extending spokes.

15. In a steering wheel, a hub structure including a bushing having an opening for engagement with a steering shaft, an outer shell spaced from the bushing and having an opening for the head of a steering column, and vertically spaced members constituting braces and spacers between said bushing and outer shell, one of said members having an upstanding portion provided with means forming a seat for a support for a horn push button and serving to center a cup of a push button assembly.

16. In a steering wheel, a hub structure including a bushing having an opening for engagement with a steering shaft, an inner shell of substantially cup-shape having its base sleeved upon and brazed to said bushing, a washer sleeved upon and brazed to said bushing below and in substantially parallel relation to the base of the inner shell, and an outer shell forming a skirt for the inner shell and bushing and brazed to a portion of said inner shell and to said washer, said outer shell having a substantially annular portion substantially concentric with the side walls of the cup-shaped inner shell, said concentric annular portion and side walls having openings therein for radially extending spokes.

HARRY F. SMITH.